Figure 4:
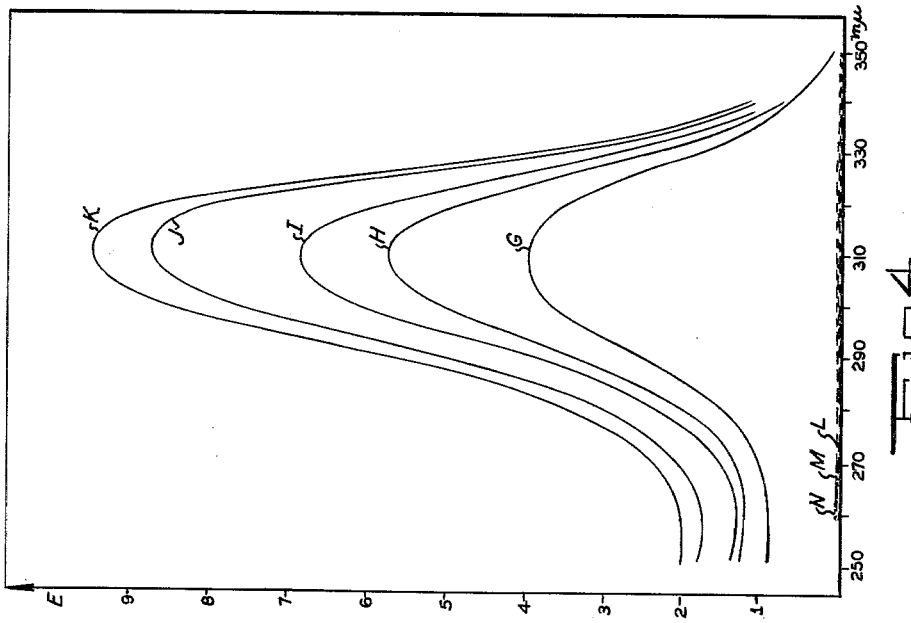

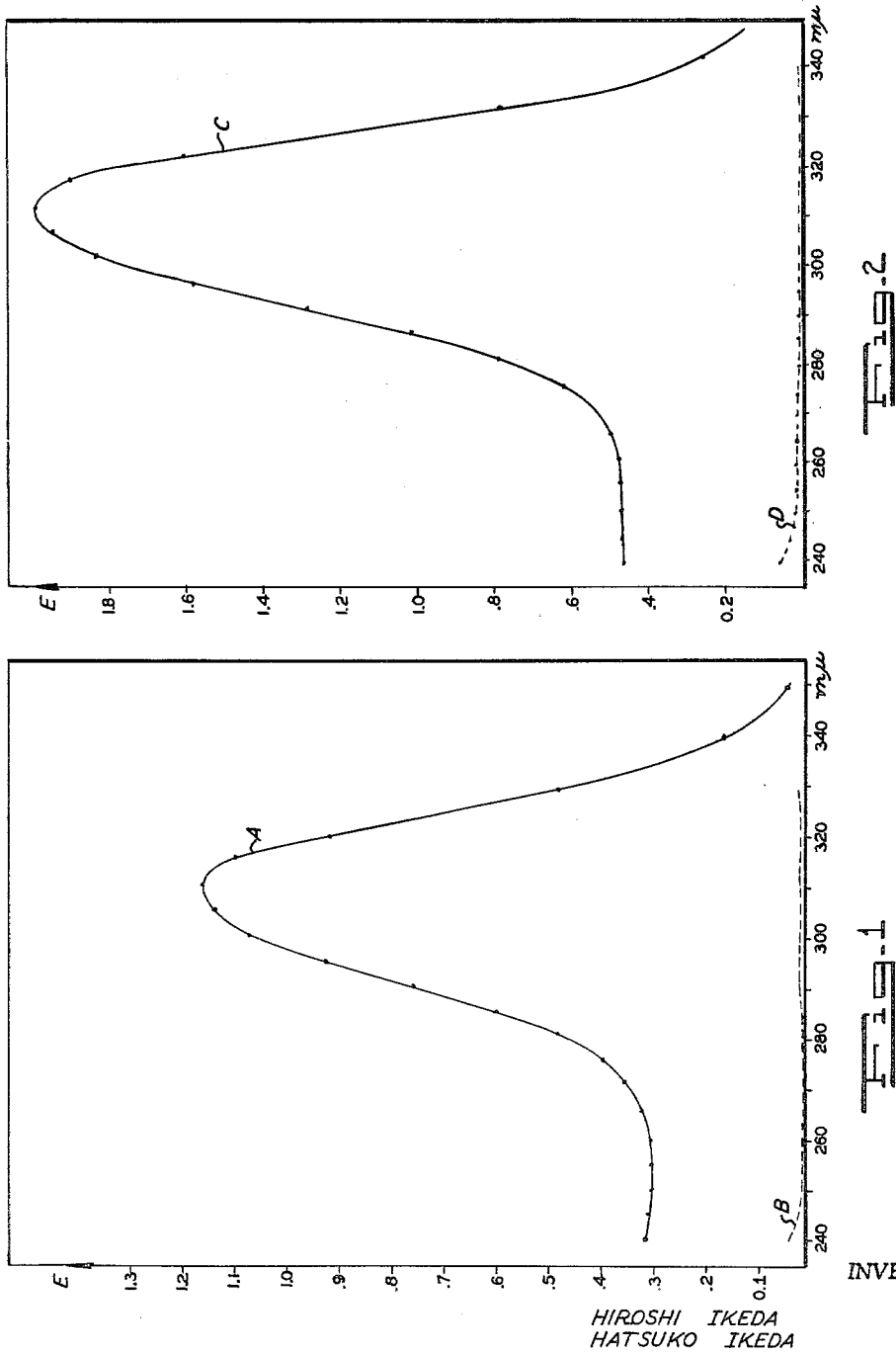

3,197,461
**SALTS OF DIHYDRODESOXYSTREPTOBIOSA-
MINES AND PROCESS FOR THE PREPARA-
TION THEREOF**
Hiroshi Ikeda and Hatsuko Ikeda, Tokyo, Japan, assignors to Rikagaku Kenkyusho, Tokyo, Japan, a corporation of Japan
Filed Jan. 16, 1962, Ser. No. 173,601
9 Claims. (Cl. 260—210)

This invention relates to new intermediate compounds, which can be used for the preparation of various tuberculostatic agents and to processes for the preparation thereof. More particularly, the invention relates to pure salts of dihydrodesoxystreptobiosamines, and method for preparing such salts.

These salts are prepared by treating the free base or sulfate of the corresponding dihydrodesoxystreptomycin with dilute sulfuric acid to decompose its molecule into 2 molecules of streptidine sulfate and sulfate of dihydrodesoxystreptobiosamine, and, after the streptidine sulfate is removed from the resultant mixture, drying the mixture at reduced pressure with or without heat.

The term "dihydrodesoxystreptomycins" employed herein has reference to the recognized genus composed of "dihydrodesoxystreptomycin" (I), "dihydrodesoxyhydroxystreptomycin" (II) and "dihydrodesoxymannosidostreptomycin" (III). The following are the chemical structures of these dihydrodesoxystreptomycins:

Chemical structure of dihydrodesoxystreptomycin:

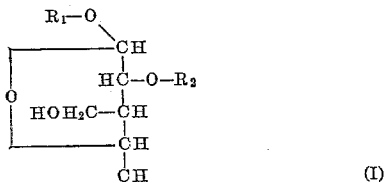
(I)

Chemical structure of dihydrodesoxyhydroxystreptomycin:

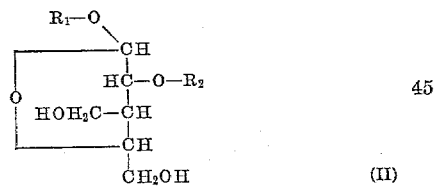
(II)

Chemical structure of dihydrodesoxymannosidostreptomycin:

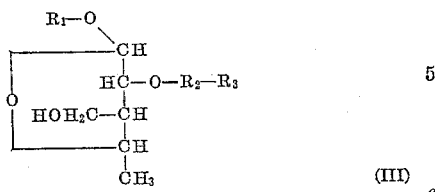
(III)

In the foregoing chemical structures, $R_1$ represents a streptidine residue, i.e.:

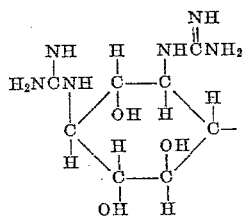

$R_2$ represents an N-methyl-L-glucosamine residue, i.e.:

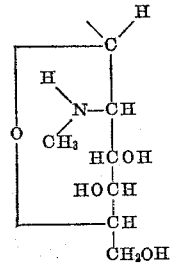

$R_3$ represents a D-mannose residue, i.e.:

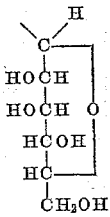

The present invention relates to the method wherein dihydrodesoxystreptobiosamine (IV) is obtained from dihydrodesoxystreptomycin (I), dihydrodesoxyhydroxystreptobiosamine (V) from dihydrodesoxyhydroxystreptomycin (II) and dihydrodesoxymannosidostreptobiosamine (VI) from dihydrodesoxymannosidostreptomycin (III); the method may be shown by the following reaction formulas:

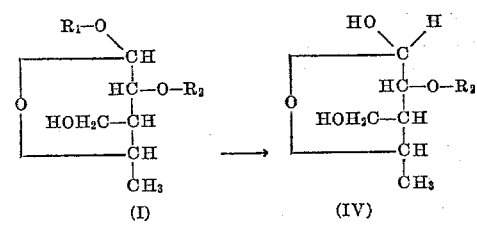

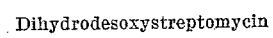 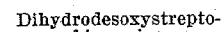

Dihydrodesoxystreptomycin — Dihydrodesoxystreptobiosamine

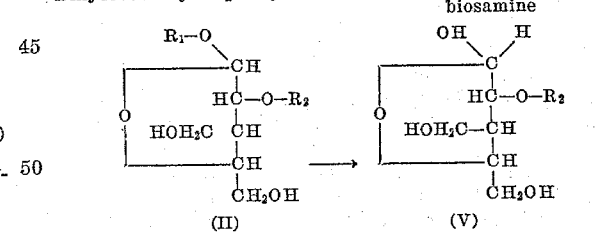

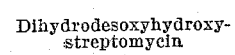 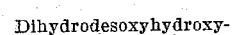

Dihydrodesoxyhydroxy-streptomycin — Dihydrodesoxyhydroxy-streptobiosamine

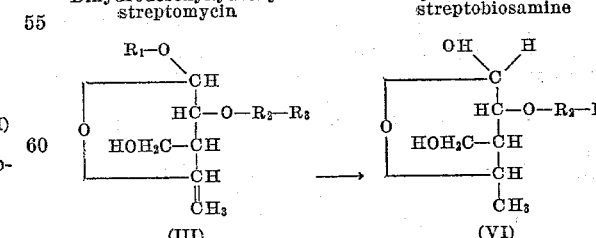

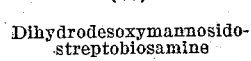

Dihydrodesoxymannosido-streptomycin — Dihydrodesoxymannosido-streptobiosamine

In the "Journal of the American Chemical Society," vol. 69, pp. 79 and 2742 (1947) and in U.S. Patent No. 2,552,547 both of them being the only literatures disclosing the compound of biosamines published prior to the present invention, the process of obtaining dihydrostreptobiosamine (VIII) from dihydrostreptomycin (VII) is described as follows:

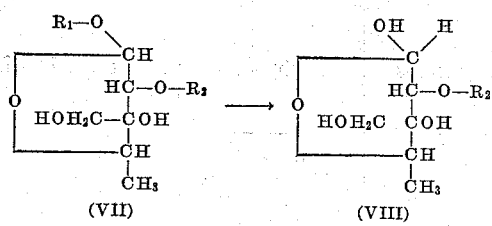

(VII)                    (VIII)

According to these publications, dihydrostreptomycin hydrochloride was dissolved in 1 N sulfuric acid and the solution was allowed to stand at 45° C. for 15–48 hours. The mother liquors which had been freed of separated streptidine sulfate were further freed from sulfate ion by adding barium hydroxide, and the filtrate was freed from excess chloride ion by the addition of silver carbonate at a pH of 6.5–7.0. The resulting solution was freeze-dried and dihydrostreptobiosamine hydrochloride was obtained as a light brown powder. It is further described that the substance, although relatively stable in the solid state, decomposed and darkened on standing in aqueous solution at room temperature.

As mentioned above, dihydrostreptobiosamine (VIII) is very unstable especially in aqueous solution. Thus, according to the above-cited literatures, freeze-drying is described as an indispensable process in the last stage of its preparation to avoid the decomposition of the substance. However, the process of freeze-drying is impracticable in industrial production since huge freeze-drying equipment is required for its mass production. More important, according to the aforementioned publications, dihydrostreptobiosamine is not completely free from partial decomposition even if freeze-dried during its preparation. Therefore, it is almost impossible to obtain the substance in pure form.

As described above, production of dihydrostreptobiosamine on an industrial scale is very difficult because of its instability, and yet the aforesaid process is practically the only method for its production.

On the other hand, while dihydrostreptobiosamine is unstable, its methylglucoside, i.e., α-methyl-dihydrostreptobiosaminide, and its acetylate, i.e., α-methyl-pentaacetyl-dihydrostreptobiosaminide, are both of high stability, so much so that the latter can be obtained as crystals with a M.P. of 194° C. Also, it is known that hexaacetyldihydrostreptobiosamine is stable. Therefore, these dihydrostreptobiosamine derivatives have been isolated and the nature of these substances has been reported by many investigators. However, because of the inactivation of the active aldehyde group from dihydrostreptose which is the sugar portion in the molecule of α-methyl-dihydrostrepto-biosaminide, it is impossible to form a glucoside out of this substance. In like manner, as all of the primary and secondary alcoholic groups in the molecule of hexaacetyldihydrostreptobiosamine are acetylated, it is also impossible to make other compounds react with this substance. Thus, it is either impossible or unprofitable to use such stable dihydrostreptobiosamine derivatives for producing other tuberculostatic agents and it appears that there is no alternative to using dihyrostreptobiosamine. In this connection, the same solution obtains with respect to dihydrodesoxystreptobiosamines.

It has been ascertained in accordance with the invention that dihydrodesoxystreptobiosamines are quite different from dihydrostreptobiosamine in that they are very stable in aqueous solution and are useful as intermediates in the manufacture of efficacious tuberculostatic agents.

For a comparison of the stability of dihydrodesoxy-streptobiosamine and the known dihydrostreptobiosamine, there have been conducted the following experiments.

1 g. of dihydrostreptomycin sulfate or dihydrodesoxystreptomycin sulfate is dissolved in 10 ml. of 1 N $H_2SO_4$ and the solution is allowed to stand for 11 hours at 45° C. Thereafter, the hydrolized mixture is allowed to stand for 8 hours at 0° C., then, the separated streptidine sulfate is filtered off and the filtrate is treated with barium hydroxide to remove the excess sulfuric acid therein in the form of barium sulfate and to maintain a pH of 6.0–6.5. The solution is then held for 5 hours at −15° C., and, after completely crystallizing out the very small amount of streptidine sulfate that remains in the solution, the filtrate (in which dihydrostreptobiosamine sulfate or dihydrodesoxystreptobiosamine exists) is diluted with water to a volume of 625 ml. (25 x 25 ml.) and the stability of the solution under the influence of temperature and time is observed.

The extent of decomposition is represented by the strength (E) of the absorption of ultraviolet radiation, and it is appreciated that decomposition is proportional to the value of E.

The result of this experiment is shown in FIGURES 1–5. The solid line and the broken line in the figures denote the E of the solutions of dihydrostreptobiosamine sulfate and dihydrodesoxystreptobiosamine sulfate respectively.

The accompanying diagram shows the absorption of ultraviolet light by dihydrostreptobiosamine sulfate and dihydrodesoxystreptobiosamine sulfate, and FIGURES 1–5 show respective values of absorption at 0° C., 10° C., 37° C., 45° C. and 90° C.

FIG. 1 shows the change of absorption, i.e. the extent of decomposition that takes place after the standing time at 0° C. FIG. 2 shows this at 10° C., FIG. 3 at 37° C., FIG. 4 at 45° C. and FIG. 5 at 90° C., respectively.

As is shown by line A in FIG. 1, the absorption of the aqueous solution of dihydrostreptobiosamine sulfate shows the instability of this solution even at as low a temperature as 0° C. By contrast, the absorption of the aqueous solution of dihydrodesoxystreptobiosamine sulfate, as shown by the broken line B, is so weak that it can almost be regarded as negligible and demonstrates the substantially perfect stability of this compound. The absorption of the aqueous solution of dihydrostreptobiosamine sulfate shows 0.105 at 310 mμ immediately before freeze drying but 0.882 after freeze drying. From this fact it can be appreciated that dihydrostreptobiosamine sulfate undergoes considerable decomposition during the process of freeze drying whereby it is practically impossible to obtain it in pure form.

The changes in the absorptions of the aqueous solutions of dihydrostreptobiosamine at 10° and 37° C. are indicated by the solid lines C and E respectively in FIGS. 2 and 3. It is seen that the absorption becomes much greater than at 0° C., signifying that the substance is very unstable and is decomposed quickly. By contrast, with regard to dihydrodesoxystreptobiosamine sulfate, the extent of the change in its absorption characteristic in aqueous solution is minimal as is clearly shown by the broken lines D and F respectively in FIGS. 2 and 3, the latter lines, indicate that the substance scarcely decomposes. The change of absorption at 45° C. is shown in FIG. 4. The temperature of 45° C. is one example of a suitable temperature adopted in drying the substance at reduced pressure in the method of the present invention. FIG. 4 represents an example where a comparatively shorter length of time is adopted as a suitable one for drying the compound at diminished pressure on an industrial scale.

In FIG. 4, lines G, H, I, J, K indicate the extent of absorption of dihydrostreptobiosamine sulfate for the standing periods of 30 minutes, 1 hour, 2 hours, 3 hours and 5 hours respectively. In each case, absorption increases very quickly as the period is lengthened. Thus, an absorption of 310 mμ becomes 9.52 after 5 hours. This clearly shows how fast the compound decomposes. On the contrary, as indicated by ends L (30 minutes), M (1 hour and 2 hours) and N (3 hours and 5 hours), the absorption of dihydrodesoxymannosidostreptobiosamine sulfate after 5 hours is only 0.056, indicating that little decomposition has taken place.

Figure 5:
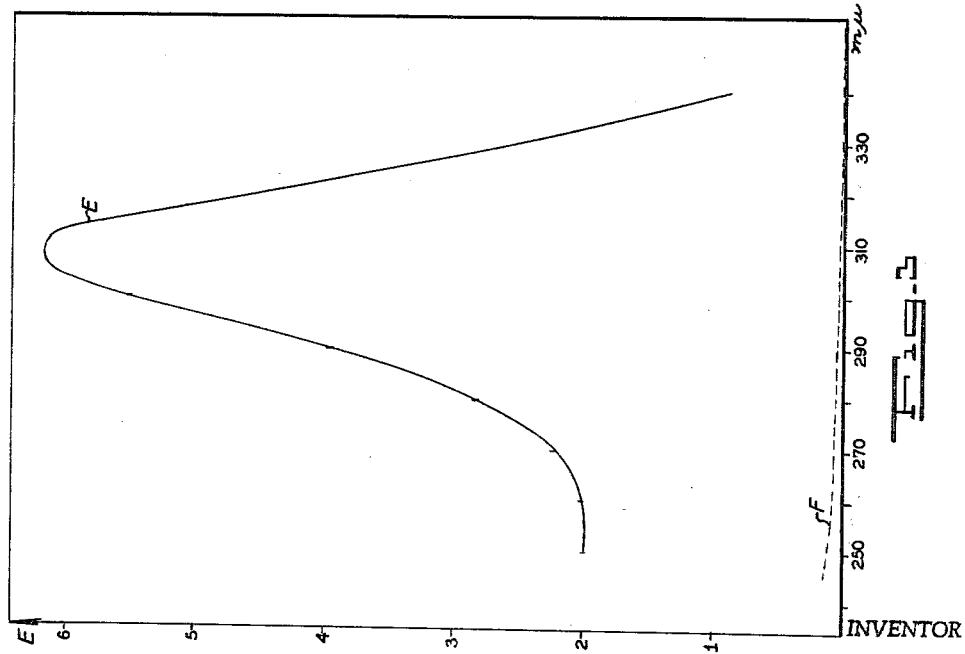
Figure 5:
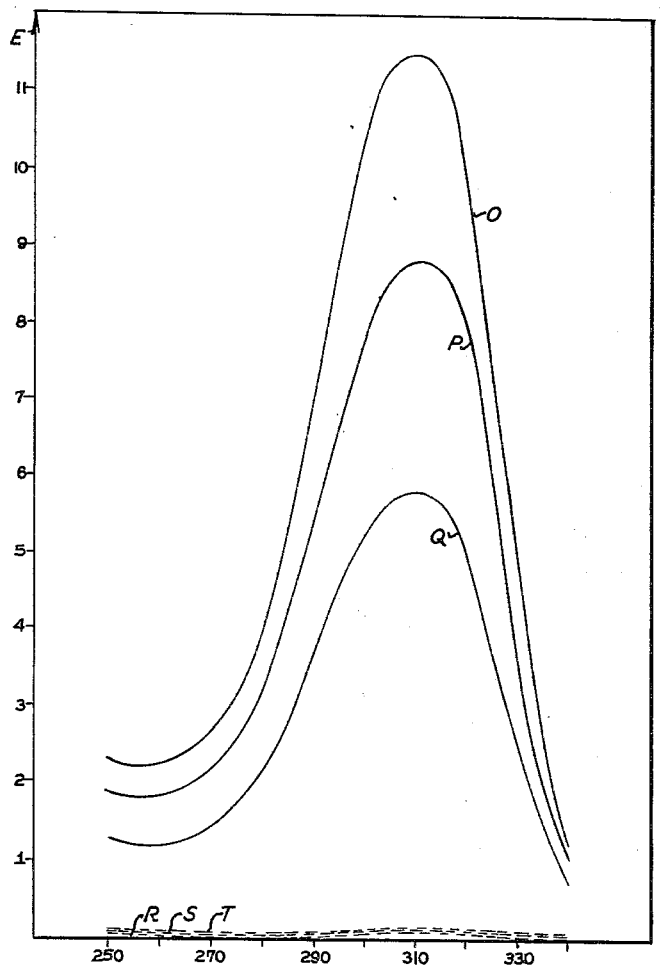

The change in absorption at 90° C. is indicated in FIG. 5. The temperature of 90° C. is another example of a temperature that can be suitably adopted in the process of drying at reduced pressure in accordance with the present invention. By adopting this temperature, the time for drying at reduced pressure may be made shorter than that when a lower temperature is adopted. As is shown by lines O (30 minutes), P (1 hour) and Q (2 hours) in FIG. 5, the absorption of the aqueous solution of dihydrostreptobiosamine sulfate increases very quickly as the period increases, indicating that this substance decomposes quicker at this temperature than at 45° C. However, the change of the absorption of the aqueous solution of dihydrodesoxystreptobiosamine sulfate is very small, signifying that the substance scarcely decomposes. The latter is indicated by lines R (30 minutes), S (1 hour) and T (2 hours).

As may be realized from the above-described experiment, the stability of the aqueous solution of dihydrodesoxystreptobiosamine sulfate is incomparably greater than that of dihydrostreptobiosamine sulfate.

It is seen from the results of the above set forth investigations, that the aqueous solution of dihydrostreptobiosamine sulfate is very unstable even at low temperatures, and that a considerable decomposition thereof cannot be avoided even during the process of freeze-drying, consequently, it is effectively impossible to isolate this substance in the solid and pure state.

On the other hand, it has been shown that the aqueous solution of dihydrodesoxystreptobiosamine sulfate is very stable even at substantially high temperatures so whereby dihydrodesoxystreptobiosamine sulfate is readily obtained in solid form from its aqueous solution by effecting drying at reduced pressure at a wide range of temperatures viz., from about 10–100° C. Thus, there is eliminated the need for resorting to an industrial unprofitable process of freeze drying.

According to known techniques, dihydrostreptomycin hydrochloride can be decomposed with sulfuric acid after which the mother liquor is placed into a refrigerator and streptidine sulfate is crystallized therefrom. These crystals are filtered off, and about 89% of the theoretical amount of streptidine sulfate is obtained. Then the mother liquor is freed from sulfate ion by means of barium hydroxide and from excess chloride by treatment with silver carbonate to a pH of 6.5, and dihydrostreptobiosamine hydrochloride is obtained by freeze drying of solution. However, the substance thus obtained is of impure quality. As a result of using dehydrostreptomycin hydrochloride as the starting material, the streptidine produced by hydrolysis with sulfuric acid will remain in the hydrolyzed solution as a mixture of hydrochloride and sulfate. Although it is possible to remove streptidine sulfate as it can completely be separated out by the above method since it is very insoluble in water, streptidine hydrochloride remains in the solution as it is soluble in water. The yield of streptidine sulfate is found to be 89% of the theoretical value. Accordingly, the substance obtained by freeze drying of the mother liquor is dihydrostreptobiosamine hydrochloride containing streptidine hydrochloride as an impurity therein. The presence of streptidine hydrochloride is easily identified by the Sakaguchi reaction.

In accordance with the present invention, by employing dihydrodesoxystreptomycin sulfate as a starting material, and hydrolyzing it with sulfuric acid, all of the streptidine is converted to streptidine sulfate which is very insoluble in water. Therefore, by concentrating and refrigerating the mother liquors, or by adding methanol to the concentrated mother liquors, streptidine can readily be completely separated from the mother liquors in the form of the sulfate. As practically 99.8–100% of the theoretical amount of streptidine sulfate can be removed in this way, dihydrodesoxystreptobiosamine sulfate of pure quality is easily obtained by the method of the present invention.

This invention contemplates the manufacturing of dihydrodesoxystreptobiosamines on an industrial scale by applying the newly discovered facts hereinabove detailed.

The present invention relates to a process for obtaining the salts of dihydrodesoxystreptobiosamines wherein the free base or sulfate of dihydrodesoxystreptomycins is heated in dilute sulfuric acid and hydrolysed, streptidine sulfate crystallizing out. With the drying thereafter of the mother liquor at reduced pressure, with or without heating, salts of dihydrodesoxystreptobiosamines are obtained.

Generally, the appropriate concentration of sulfuric acid to be used for hydrolysis in the present invention is within the range of 0.5–2.0 normal. At below 0.5 normal, the desired product may be obtained but the time for hydrolysis will be prolonged. Above 2.0 normal, there is a danger that the dihydrodesoxystreptobiosamines may be decomposed. If 10–30% methanol is added, the time required for hydrolysis can be shortened.

The desirable temperature range for this hydrolysis is generally 40–50° C. At such temperature range, hydrolysis will be completed in 10–15 hours. In this range of temperature, hydrolysis may proceed, but its speed will be lowered. Above this range of temperature, there is a danger that dihydrodesoxystreptobiosamines will be destroyed.

For the purpose of removing streptidine sulfate, the hydrolyzate is allowed to stand for 5–10 hours at 0° C. and streptidine sulfate is crystallized out. The crystals are filtered, and to the filtrate there is added barium hydroxide to a pH of 6.2. The solution is freed from excess sulfuric acid by removing it as a precipitate in the form of barium sulfate. Then the solution is concentrated at reduced pressure to about 1/10 of its volume. This concentrated solution is either held for 2–3 hours at 0° C. or mixed with an equal amount of methanol and the very small amount of remaining streptidine sulfate can thereby be completely crystallized out.

For concentrating and drying at reduced pressure the solution from which the streptidine has been removed, a temperature within the range of 30–80° C. generally gives the best results. At lower temperatures, the object of the invention may be achieved as mentioned above, but a longer time will be required for drying. Higher temperatures, i.e., up to 100° C. may be employed, but at temperatures above that, the salts of dihydrodesoxystreptobiosamine might decompose. Thus, temperatures higher than 100° C. generally are unsuitable for obtaining a substance of pure quality.

From the pure sulfate of dihydrodesoxystreptobiosamines obtained by the present invention, pure hydrochloride of dihydrodesoxystreptobiosamines can be readily obtained. Thus, when barium chloride is added to an aqueous solution of dihydrodesoxystreptobiosamine sulfate of pure quality prepared by the above-mentioned process, the sulfate ion is precipitated as barium sulfate and is completely separated out by the following chemical reaction:

$2(C_{13}H_{25}O_8N \cdot \tfrac{1}{2}H_2SO_4) + BaCl_2$
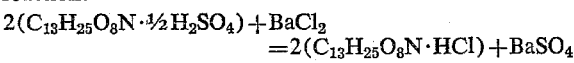
$= 2(C_{13}H_{25}O_8N \cdot HCl) + BaSO_4$ The precipitate is removed by filtering, and then, by drying the mother liquor at reduced pressure, dihydrodesoxystreptobiosamine hydrochloride of pure quality can easily be obtained on an industrial scale.

The following examples illustrate methods of carrying out the present invention, but it is to be understood that these examples are given by way of illustration and it is not intended to be limited thereby.

*Example 1*

A quantity of 7 g. of dihydrodesoxystreptomycin sulfate is dissolved in 70 ml. of 1 N sulfuric acid and after standing 11 hours at 45° C. (if in this example 15 ml. of methanol is added to the solution, 7 hours will be enough for standing), the solution is allowed to stand for 8 hours at 0° C. Then, the crystals of separated streptidine sulfate are filtered. To the filtrate there is added in powder form, barium hydroxide to a pH of 6.2. Then the resultant precipitate of barium sulfate is filtered off, and the mother liquor is concentrated to a volume of about 1/10 at reduced pressure at 45° C. After the solution has been allowed to stand for 3 hours at 0° C. (instead of holding at 0° C., an addition to the solution of 5 ml. of methanol may be made), the separated crystals of streptidine sulfate are removed, and then, by further drying the filtrate at reduced pressure at 45° C., dihydrodesoxystreptobiosamine sulfate of pure quality is obtained as a white powder.

Yield: 95%, M.P. (dec.) 145° C.
Analytical result—
 Calculated value: C=41.93%, H=7.04%, N=3.76%, $SO_4$=13.03%
 Analytical value: C=42.21%, H=6.95%, N=4.09%, $SO_4$=12.79%

*Example 2*

A quantity of 5.6 g. of free base of dihydrodesoxystreptomycin is dissolved in 99 ml. of 1 N sulfuric acid. Then, by following the same process as set forth in Example 1, dihydrodesoxystreptobiosamine sulfate is obtained.

Yield: 95%, M.P. (dec.) 145° C.
Analytical result—
 Calculated value: C=41.93%, H=7.04%, N=3.76%, $SO_4$=13.03%
 Analytical value: C=42.05%, H=7.09%, N=4.01%, $SO_4$=12.94%

*Example 3*

A quantity of 3.6 g. of dihydrodesoxystreptobiosamine sulfate obtained by the application of the process in Example 1 is dissolved in a quantity of 10 ml. of water. 5 ml. of the 20% aqueous solution of barium chloride is added to this solution. The resulting precipitate of barium sulfate is filtered off, and by drying the filtrate at reduced pressure at 90° C., dihydrodesoxystreptobiosamine hydrochloride of pure quality is obtained in white powder form.

Yield: 97%
Analytical result—
 Calculated value: C=43.39%, H=7.28%, N=3.89%, Cl=9.85%
 Analytical value: C=43.51%, H=7.09%, N=4.01%, Cl=9.92%

*Example 4*

A quantity of 7 g. of dihydrodesoxyhydroxystreptomycin sulfate is dissolved in 70 ml. of 1 N sulfuric acid and held for 11 hours at 45° C. (when, in this example, 15 ml. of methanol is added to the solution, it need only stand for 8 hours). Then the solution is allowed to stand for 8 hours at 0° C., and the separated crystals of streptidine sulfate are filtered off. To the filtrate, there is added barium hydroxide in powder form to a pH of 6.2, and the resulting precipitate of barium sulfate is filtered off. The filtrate is concentrated at reduced pressure at 45° C. to a volume of about 10 ml. The solution is allowed to stand for 4 hours at 0° C. (instead of holding the solution at 0° C., the same effect may be achieved with the addition of 4 ml. of methanol thereto). Then, the separated crystals of streptidine sulfate are removed, and, by drying the filtrate at reduced pressure at 45° C., dihydrodesoxyhydroxystreptobiosamine sulfate is obtained in white powder form.

Yield: 94%
Analytical result—
 Calculated value: C=37.12%, H=6.75%, N=3.61%, $SO_4$=12.37%
 Analytical value: C=37.00%, H=6.21%, N=3.45%, $SO_4$=11.9%

*Example 5*

A quantity of 10 g. of dihydrodesoxymannosidostreptomycin sulfate is dissolved in 80 ml. of 1 N sulfuric acid, and held for 12 hours at 45° C. (if, in this example, 20 ml. of methanol are added to the solution, it need only be held for 7 hours). The solution is allowed to stand for 7 hours at 0° C., and the separated crystals of streptidine sulfate are filtered. To the filtrate is added barium hydroxide in powder form to a pH of 6.2. The resultant precipitate of barium sulfate is filtered off and the mother liquor is concentrated at reduced pressure at 45° C. to a volume of about 12 ml. Then the solution is allowed to stand for 4 hours at 0° C. (instead of holding at 0° C., there may be added 5 ml. of methanol to the solution to achieve the same effect). The separated crystals of streptidine sulfate are removed, and, by drying the filtrate at reduced pressure at 45° C., dihydrodesoxymannosidostreptobiosamine sulfate of pure quality is obtained in white powder form.

Yield: 93%
Analytical result—
 Calculated value: C=42.69%, H=6.79%, N=2.62%, $SO_4$=8.99%
 Analytical value: C=42.41%, H=6.28%, N=2.21%, $SO_4$=8.67%

Modifications may be made in carrying out the present invention without departing from the spirit and scope thereof, and our invention is to be limited only by the appended claims.

We claim:
1. Dihydrodesoxystreptobiosamine sulfate.
2. Dihydrodesoxystreptobiosamine hydrochloride.
3. Dihydrodesoxyhydroxystreptobiosamine sulfate.
4. Dihydrodesoxyhydroxystreptobiosamine hydrochloride.
5. Dihydrodesoxymannosidostreptobiosamine sulfate.
6. Dihydrodesoxymannosidostreptobiosamine hydrochloride.
7. A process for preparing a sulfate of a dihydrodesoxystreptobiosamine compound selected from the group consisting of dihydrodesoxystreptobiosamine, dihydrodesoxyhydroxystreptobisoamine and dihydrodesoxymannosidostreptobiosamine said process comprising hydrolyzing a substance selected from the group consisting of the free base and sulfate of antibiotics selected from the group consisting of dihydrodesoxystreptomycin, dihydrodesoxyhydroxystreptomycin and dihydrodesoxymannosidostreptomycin with dilute sulfuric acid, removing streptidine sulfate from the resulting reaction product, removing the excess sulfate ion by the addition of barium hydroxide, and drying the resulting solution under reduced pressure at a temperature of from 10 to 100° C.

8. A process as claimed in claim 7, wherein 10 to 30% of methanol based on the volume of the sulfuric acid is initially added to the said substance.

9. A process for preparing hydrochloride of a dihydrodesoxystreptobiosamine compound selected from the group consisting of dihydrodesoxystreptobiosamine, dihydrodesoxyhydroxystreptobiosamine and dihydrodesoxymannosidostreptobiosamine, said process comprising adding barium chloride to an aqueous solution of the sulfate of the corresponding dihydrodesoxyhydroxystreptobiosamine compound, removing the precipitated barium sulfate from the resulting reaction product and drying the resulting filtrate under reduced pressure at a temperature of from 10 to 100° C.

References Cited by the Examiner

UNITED STATES PATENTS

| | | | |
|---|---|---|---|
| 2,552,547 | 5/51 | Fried et al. | 260—210 |
| 2,803,650 | 8/57 | Yabuta et al. | 260—210 |
| 2,837,510 | 7/58 | Yabuta et al. | 260—210 |
| 3,049,535 | 8/62 | Yabuta et al. | 260—210 |

OTHER REFERENCES

Lemieux et al.: J.A.C.S., vol. 68, 1946, pp. 2747–2748.

LEWIS GOTTS, *Primary Examiner.*